Figure 1:
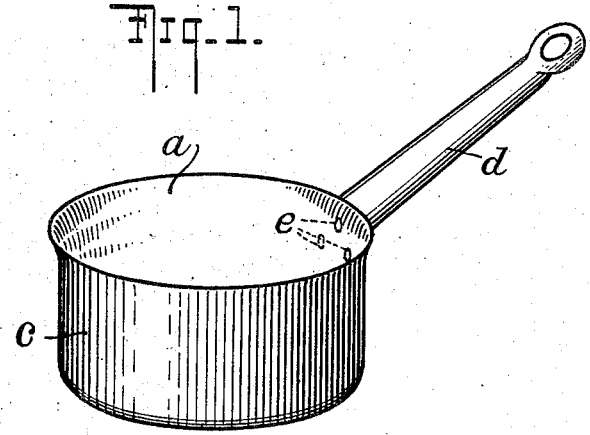

Oct. 13, 1936.　　　　M. H. SOMMER　　　　2,057,254
RECEPTACLE
Filed Aug. 18, 1934　　　　2 Sheets-Sheet 1

INVENTOR
MARTIN H. SOMMER
BY
ATTORNEYS

Oct. 13, 1936. M. H. SOMMER 2,057,254
RECEPTACLE
Filed Aug. 18, 1934 2 Sheets-Sheet 2
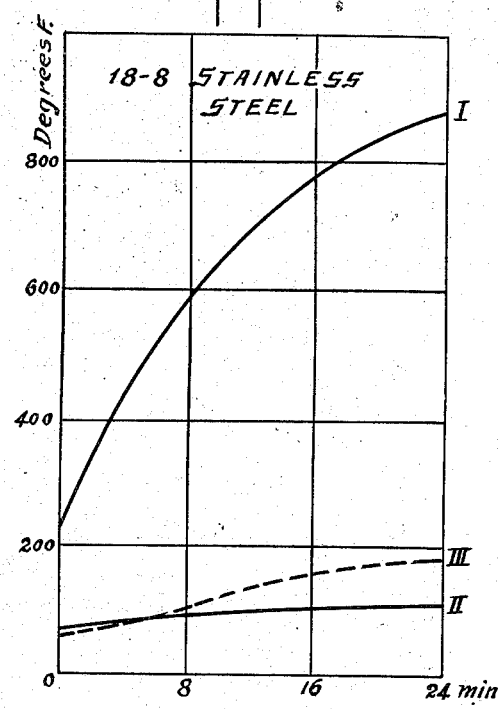
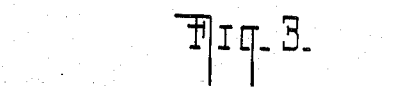
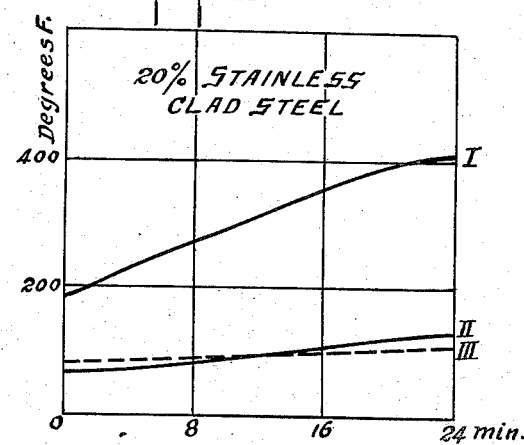
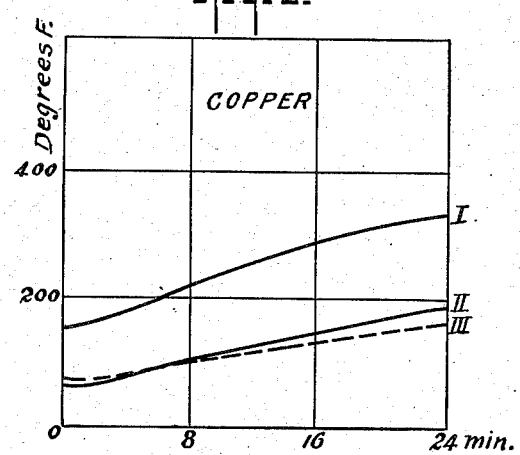
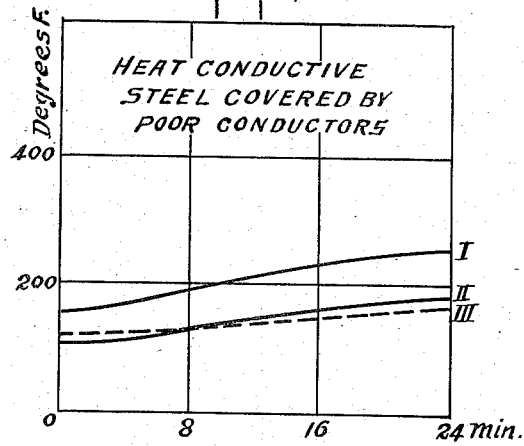
INVENTOR
MARTIN H. SOMMER Patented Oct. 13, 1936

2,057,254

UNITED STATES PATENT OFFICE 2,057,254

RECEPTACLE

Martin H. Sommer, New York, N. Y.

Application August 18, 1934, Serial No. 740,430

7 Claims. (Cl. 53—1)

This invention relates to improvements in receptacles having a surface constituted of corrosion-resistant steel and particularly to such receptacles when used as cooking utensils. The object of the invention is to provide relatively inexpensive receptacles of the stated type capable of receiving and retaining a coating of vitreous enamel and of increased efficiency, particularly with respect to the transfer of temperature through the walls of the vessel.

The invention will be more particularly described in connection with a utensil designed for cooking purposes in which field the invention is of special importance.

As soon as corrosion-resistant or stainless steels were invented it was immediately recognized that such material might be used for the production of pots, pans, skillets or other vessels or receptacles for storing or handling food products but practical experience has not yet developed satisfactory vessels of this character. While cooking utensils of corrosion-resistant steels have appeared upon the market they have been relatively expensive and inefficient, particularly in their heat characteristics. The metal of which corrosion-resistant steel is constituted, i. e. iron and chromium, with or without nickel, while satisfactory so far as concerns non-corrosive and non-tainting action, posseses poor heat-transfer characteristics. The low heat conductivity of these alloys, which is approximately one-third the heat conductivity of an average grade of iron or ordinary steel, results in an inefficient cooking operation. For example a portion of the food in contact with the bottom of a receptacle constituted of corrosion-resistant steel may be thoroughly cooked and may be burnt before the upper portion of the food is adequately cooked so that a cook using such utensils is required to give constant and painstaking attention to the food during the entire process of the cooking operation and must repeatedly turn or stir the food to obtain an even, approximately uniform, cooking result.

Another objection to the use of corrosion-resistant steel for cooking utensils is that it is discolored by a directly applied flame, such discoloration starting with a brown at a temperature of approximately 450° F. and changing into yellow at higher temperatures. The outside bottoms of cooking utensils are often subjected to temperatures of this order so, that it is impossible to avoid such discoloration at this portion of the utensil if it is made of corrosion-resistant steel. While this discoloration does not affect the properties of the utensil in any way, it spoils its appearance and cannot be removed with the ordinary means available in a kitchen.

The net outcome of the situation is that cooking utensils of corrosion-resistant steel have fallen into disfavor.

I have now discovered that the entire situation can be remedied provided the utensils are not made of stainless steel material throughout but are constituted of at least three layers, each having distinct properties of its own and all co-operating toward producing a uniform distribution of heat within the utensil.

The invention contemplates, first, that the only part of the utensil which must be constituted of corrosion-resistant steel is the surface thereof which is exposed to corrosive influences, i.e. in a cooking vessel its inner lining; that it should not be necessary to construct the entire utensil of stainless steel but that only a very thin lining of this material is required to assure the necessary stainlessness of the utensil at the point where it is to resist corrosion by food or other substances; second, my new conception contemplates an exterior reinforcement of the thin lining of stainless metal, said reinforcement to consist of a metal such as ordinary steel or the like which has a high heat conductivity and should therefore be capable of proper heat distribution to all parts of the stainless lining. In the third place, my new conception contemplates the use in connection with the stainless-clad metal body of the utensil of an exterior coat of poor heat conductivity to protect the surface of the non-corrosion-resistant metal against corrosion or destruction and to deflect the heat conducted by the non-corrosion-resistant metal through the corrosion-resistant lining. The material used for this outer coat is the ordinary vitreous enamel such as has been used for a long time in connection with cooking utensils not involving the presence of any stainless steel. Stainless steel cannot be directly coated with such enamel, but by virtue of the reduction in the thickness of the stainless steel element and the spacing of the stainless lining from the enamel by an interposed section of material such, for example, as ordinary steel or iron, it becomes possible for the first time to use an enamelled surface in connection with a utensil which for practical purposes is a stainless steel utensil.

A utensil or receptacle made in accordance with my new invention is relatively inexpensive in comparison with corresponding receptacles made wholly of stainless steel, is attractive in appearance, and supplies a satisfactory distribution of heat.

Figure 2:
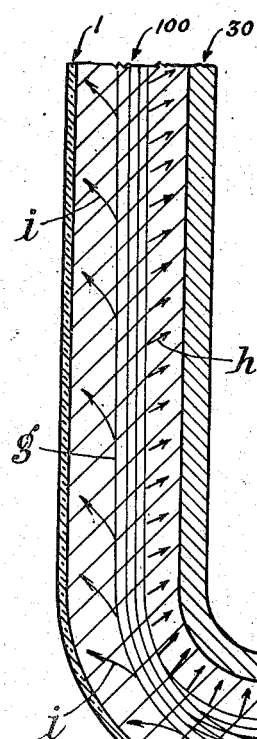
Figure 2:
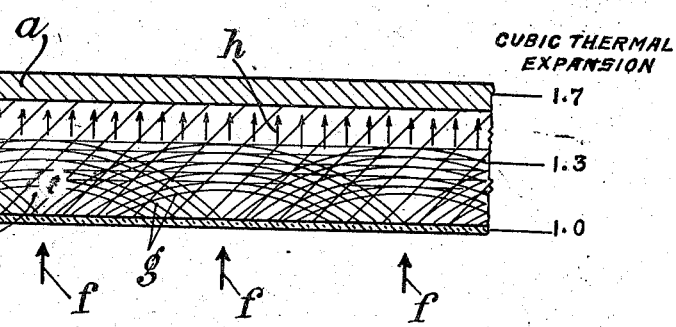

The invention is illustrated in the accompanying drawings in which Fig. 1 shows a saucepan embodying the invention, and Fig. 2 shows a cross-section through a part of the side and part of the bottom of the saucepan of Fig. 1. Figs. 3 to 7 are diagrammatic views showing comparative heat distribution in vessels constituted of several different materials.

In the drawings, *a* represents the corrosion-resistant lining, *b* represents the excellent heat-conducting intermediate portion made of ordinary steel, *c* is the coating of vitreous enamel, *d* represents the handle, and *e* represents the points where the handle was welded to the intermediate steel portion *b* before the vessel and its handle were coated with enamel and the enamel permanently fused in place. In Fig. 2 the heat source is indicated by the arrows *f*; the series of lines *g* indicate lines of thermal distribution; the arrows *h* indicate the manner in which even distribution of heat is imparted to the stainless lining *a* while the arrows *i* indicate by their relatively small number that but a small part of the heat distributed through the steel core metal is dissipated through the enamel coat and that the major part of the available heat is transmitted from the core through the lining *a*. At the upper left-hand corner of Fig. 2 a typical ratio of heat-conductivity of the several layers is indicated while at the lower right-hand corner of Fig. 2 the cubic thermal expansion of the several layers at the stated ranges of temperature and with the enamel coat given as the unit 1, are indicated.

The handle *d* is constituted of ordinary steel and is also coated with enamel representing a continuation of the surface *c*. It is not necessary that the enamel coat should be applied to the handle and in the case of a frying pan or the like the handle may sometimes not be enamelled at all but for many utensils an enamelled handle is preferable.

The material of which the corrosion-resistant lining is made is preferably that variety of corrosion-resistant alloy which has a stable surface and is an alloy containing iron and approximately 16–20% chromium and approximately 2–12% nickel (preferably 18 Cr and 8 Ni) with sufficient titanium or equivalent to form stable carbides with practically all of the small amount of carbon (usually .12% or less) contained in the alloy. The use of an 18–8 alloy containing titanium or the like is particularly recommended because in ordinary 18–8 steel the carbon tends to come out of solution in the metal when the metal is exposed to temperatures of between 500° C. and 900° C. equivalent to a drawing treatment, leaving the alloy where the carbon has settled at the grain boundaries quite devoid of all resistance to corrosion. This effect is avoided when the carbon is bound in stable carbide form with a substance such as titanium. Using the type of corrosion-resistant steel which I have described, makes it possible to weld the handle to the metallic body of the utensil without destroying the corrosion-resistance of the lining in the region of *e* where the weld is effected. The same considerations apply with respect to the effects of the enamelling process since the fusion of the enamel coat involves temperatures such as 1600° F.

The intermediate section *b* is preferably constituted of ordinary mild steel but suitable copper alloys, cast iron, or the like, may also be used.

The enamel coat may be of any standard variety of vitreous enamels, not fusible except at relatively very high temperatures of the general order of 1600° F. and having a rate of expansion somewhat smaller but close to that of the mild steel. A typical example is noted against Fig. 2 of the drawings. The progression of relative expansion there noted for the three sections of the product are of importance in preserving the unity of structure and preventing the several layers from separating from each other due to the large difference in ranges of temperature to which they are subjected. A vitreous enamel such as may be produced from feldspar, quartz, fluorspar, soda ash, borax, etc. according to well known methods and to which an oxide or other suitable material is added to give it color, excellently serves my purposes. Usually the enamel section *c* comprises a series of superimposed coats, for example a ground coat which may be mixed with colbalt oxide while the top or outside coat may contain cobalt and chromium oxides in such combination as to make the enamel stainless. The enamel coatings are applied in the usual manner, i. e. each coating is spread on, dried, and then baked or fused at a temperature of approximately 1600° F. In order to successfully bond the vitreous enamel to the central section *b*, I have found it preferable to have the thickness of the steel section *b* with relation to the lining *a* lie within certain limits so that the coefficient of expansion of the surface of the section *b* to which the enamel is applied shall be close enough to that of the enamel to avoid failure. If the thickness of the corrosion-resistant steel lining were closely approaching or even greater than that of the central layer *b* of iron or low carbon steel or the like, it would tend to make the core section *b* expand or contract beyond its normal rate to an extent which tends to crack the enamel when the receptacle is heated or removed from the heating of the oven in which the fusing of the enamel is conducted. A structure which will exhibit excellent qualities is for example one in which the core section *b* is three to five times as thick as the corrosion-resistant lining *a* but the lining *a* can be made very much thinner down to approximately 4% of the thickness of *b* and the lining *a* may also be more than stated, though it should not quite approach the thickness of *b* in any event. With the indicated thickness of the lining *a* with relation to that of the core section *b*, the core section *b* is sufficiently strong to considerably retard the rate of expansion or contraction of the lining *a*, any differences being almost entirely absorbed by the material of the core section *b* so that the surface thereof to which the enamel is bonded will expand or contract at substantially its normal rate, thereby placing no strain on the enamel layer whose constituents are preferably so proportioned that the rate of expansion of the enamel is closely akin to that of the core *b*. Furthermore, by maintaining the thickness of the vitreous enamel coating in the neighborhood of .001" to .005", the coefficient of expansion of the structure as a whole is such that no undue strain is created on any of the layers or the bonds when the receptacle is subjected to changes in temperature, thereby preventing any failure of the enamel layer or of the bond between it and the core section *b*.

In making the utensil the lining *a* and the core section b can be made separately and then united by a welding operation or a composite sheet of the plain steel and corrosion-resistant steel may first be welded together and then shaped simultaneously to the desired configuration.

It is vital as stated that receptacles intended for use for cooking purposes should possess good heating characteristics so that the food will be uniformly heated during the cooking process and my product possesses this essential property. By using only a relatively thin lining of corrosion-resistant steel and relatively inexpensive material such as ordinary steel or iron for a core section and an enamel coating on the core section, I am enabled to produce a stainless steel utensil at a cost which compares favorably with corresponding receptacles made of any other material. It is astonishing to believe that a bad heat conductor like stainless steel can be made thoroughly efficient as a heat conductor by being lined with an excellent heat conductor like ordinary steel which in turn is coated with a poor heat conductor like enamel. Ordinary 18—8 chrome nickel steel has a heat conductivity of about .05 calories per second per square centimeter per centimeter thickness per degree centigrade at room temperature. This is approximately only one-third of the heat conductivity of a good grade of iron or ordinary steel. The result of this poor heat conductivity is that when cooking in utensils made wholly of 18—8 chrome nickel steel the bottom near the source of heat becomes hot while the upper portions of the utensil have a temperature materially below that of the bottom, a condition which results in poor culinary effects.

The heat distribution accomplished by the present invention in contrast with corresponding articles differently constituted is illustrated in Figs. 3 to 7 of the drawings. Fig. 3 represents generally the nature of the test. The vessel in each case was filled to a height of one inch with milk. Thermo couples were positioned at points I, II, and III, point I being located at the bottom of the vessel, five inches from one side thereof. Point II was similarly located four inches nearer the said wall and point III was located at said side wall two inches above the liquid level. A pointed flame of city gas under constant pressure was placed underneath the vessel directly under point I. When the vessel was one which was composed throughout of 18—8 steel, results were obtained as shown in Fig. 4. At the point directly over the flame, there was a very rapid ascent of temperature reaching 600° F. after eight minutes and quickly exceeding the burning point of milk. At point II, which was cooled by the liquid, the temperature did not even exceed 100° F. after twenty-four minutes of heating. At point III, not being cooled by the milk, a higher temperature was reached than at point II. The great unevenness in heating and the cause of burning and the inefficient heat distribution are apparent.

In Fig. 5 the experiment involved a utensil composed of an outer section of ordinary steel and a lining one-fourth as thick of 18—8 steel. The great improvement over solid stainless steel is obvious but the difference of temperature between the point immediately above the flame and the other two points is still large and burning might occur occasionally.

In Fig. 6 the utensil was constructed of copper. The excellent heat conductivity of copper is expressed by the fairly uniform ascent of temperature at all three points, the point above the flame maintaining a temperature about 150° F. higher than the other two points.

In Fig. 7 a utensil was used substantially identical with the one employed in the case of Fig. 5 but in which the ordinary steel shell was enamelled in accordance with the invention. The excellent uniformity in temperature at all three points is apparent, showing the extremely favorable effect of this combination. The temperature difference is held to a minimum of about 50°, a performance which surpasses even copper. The possibility of burning is practically eliminated. The enamel layer, being the poorest heat conductor of the combined structure, in part serves the purpose of assuring that the major portion of the heat conducted through the ordinary steel core is deflected or diverted through the stainless lining as at points II and III and not in the opposite direction through the enamel.

Attempts to apply vitreous enamel to 18—8 chrome nickel steel have not as yet proven successful, but even if it could be done, it would only accentuate the effects of poor heat conductivity because the enamel as well as the stainless steel is a poor heat conductor. The article produced in accordance with this specification is, however, so far as appearance goes, an enamelled stainless steel product and is, I believe, the first product having this apparent constitution, and by "enamelled" in this connection I mean coated with vitreous enamel and do not include enamels or enamel paints which are not fused at high temperatures onto the surface of the utensils.

By interposing the core of ordinary or soft steel I not only secure the necessary heat conductivity of the article as a whole, but also am enabled to apply the enamel and to maintain the proper bonding as between the enamel and the core material and between the core material and the stainless lining and at the same time completely conceal and protect from corrosion or other destructive effects the whole of the soft steel core and make the product appear to be nothing more than a stainless steel vessel with a coating of vitreous enamel of high fusion point.

The core section b may obviously be of various compositions, iron, steel, suitable copper alloys, cast iron or cast steel, or even other metal, provided in each case it possesses the quality of high heat conductivity, the capacity to retain a vitreous enamel coating, and a rate of thermal expansion which is sufficiently close to that of both the enamel and the stainless steel layer to assure proper cohesion of the structure under its various conditions of manufacture and use.

Although the 18—8 chrome nickel steel is the preferred type of alloy for the stainless side of the receptacle, any other corrosion-resistant metals or alloys may be used. Thus for some purposes pure nickel or a suitable nickel alloy or other alloy or metal may be used in place of the noncorrosive steel.

Although making the utensil from a composite sheet of plain steel and corrosion-resistant steel, as above stated is probably the most satisfactory method to employ for making the utensil, other methods of arriving at a similar result can be used. Thus the corrosive resisting steel and non-corrosion-resisting metal may be first rolled down to approximate size separately and then pressed or rolled together or united by welding or pressed or rolled with an intermediate layer of a thin sheet of metallic material heated to effect perfect fusion. Or the two metals may be cast in a mold and the slabs thus formed rolled into sheets, or after properly shaping one of the metal sections the metal of the other section may be sprayed thereon, or the two shapes may be formed separately, one fitting closely within the other and then fused or welded together, or one metal may be cast around the finished layer of the other. In some constructions a thin shell of the corrosion-resistant steel may first be made and used as a core in a casting mold and the ordinary steel or cast iron cast around such shell to form the receptacle desired with or without handles or other attachments. This method is especially desirable for producing heavy food containers such as are used in hotel, restaurant, and hospital kitchens. In such receptacles the stainless steel layer should be sufficiently heavy to withstand the heat of the liquid steel or cast iron flowing around it without warping. In other constructions the inner stainless layer need not be bonded to the central or core layer at all but may be pressed into position in a vacuum or stamped into a form slightly larger than the inner part of the core section and forced into position after the core section has been heated sufficiently to allow insertion of the stainless steel section. The particular manner in which the two layers are connected together will depend on the kinds of material of which such layers are constructed and the most economical method of accomplishing the desired structure. It is also within the contemplation of this invention to use an intermediate layer of pure iron between the corrosion-resistant steel and the non-corrosion-resistant steel which will equalize the different properties of the two steel layers to a greater extent than if they were directly bonded together thereby producing a better and tighter bond between such steel layers. An intermediate bonding layer is especially desirable for uniting the corrosion-resistant steel with a layer of copper or copper alloy because galvanic action between the stainless steel and the copper layer may thus be forestalled.

As a rule the stainless steel section of the utensil will require to be pickled, ground, and polished to remove any scale and discolorations on its surface such as result from exposure to high temperatures experienced in the manufacture of the composite sheets or the application of the enamel. Pickling after enamelling is desirable as the scale is hard and it is not economical to remove it by grinding alone. The pickling solution should, however, be one which itself will not or whose fumes will not affect or injure the enamel.

The vitreous enamels referred to are most satisfactory for ordinary purposes, although asbestos, silicious earth, and other material may also be used, provided in each case that they have a lower heat conductivity than that of the materials constituting the utensil and provided they are capable of adhering tightly to the core section and will withstand the effects of heat such as occur in the metallic sections while the receptacle is in use or during the time that the coat is fused upon the surface. The ordinary enamelled coatings are usually applied in several layers until the desired thickness is reached.

The handle or other attachments where desired may be attached by gas-welding or other suitable method. By the use of an opaque enamel all marks or deformities left on the core section as the result of welding on the handle or otherwise are effectively covered and concealed by the enamel layer and give the finished article a good appearance and without necessitating an excess of labor to grind or otherwise clean the joined parts.

While the receptacle shown and described is primarily a saucepan, it is obvious that the invention may be employed to equal advantage in food or other receptacles which may be used for storage or transportation of foods, for drinking cups, dippers, hospital trays, and numerous other purposes. In such cases the arrangement of the layers, the composition, heat characteristics, and thickness of the materials constituting such layers may be varied to suit conditions under which such receptacles are to be used and for the purpose of obtaining the results which are desired with respect to such receptacles.

I claim:

1. A utensil constituted of three layers of different materials whose coefficient of expansion as a whole is such that no undue strain is created in any of the layers when the receptacle is subjected to changes in temperature, the center layer being composed of a metal having high heat conductivity and of sufficient strength and thickness for the purposes of the receptacle, and the outer layers of which consist of corrosion resisting materials having relatively low heat conductivity so that when heat is applied at any point of the utensil, it is caused to flow through said center layer, thereby distributing such heat throughout the center layer, one of said layers being composed of a corrosion resisting chrome-nickel steel alloy and the other of said outer layers being constituted of a hard vitreous material bonded to said center layer and having a heat conductivity substantially lower than the steel alloy layer so that the major portion of heat when conducted through said vitreous layer to said center layer is diverted through said stainless steel layer.

2. A receptacle constituted of three layers of different materials whose coefficient of expansion as a whole is such that no undue strain is created in any of the layers when the receptacle is subjected to changes in temperature, the center layer of which is composed of a metal having good heat conductivity and of sufficient strength and thickness for the purposes of the receptacle, and the outer layers of which consist of corrosion-resisting materials having relatively low heat conductivity so that when heat is applied at any point of the receptacle, it is caused to flow through the center layer, one of said outer layers being constituted of a vitreous enamel of high fusion point and low heat conductivity bonded to said center layer under high heat and the other of said outer layers consisting of a very thin lining of a corrosion-resisting chrome-nickel steel alloy which does not lose its corrosion-resistant properties after exposure to the temperature ranges involved in the fusion of the enamel to said center layer.

3. A utensil which is adapted for the application of exteriorly applied heat to the contents thereof and capable of transmitting such heat approximately uniformly to the interior thereof, said utensil comprising a metallic core of relatively good heat conductivity, an inner and outer lining for said core adapted to cause the heat applied to the utensil to flow through said core to the unheated portions of the utensil, said inner lining being constituted of stainless steel alloy having a heat conductivity substantially less than that of the core and said outer lining being composed of an enamel capable of withstanding the effects of the applied heat and having a distinctly poorer heat conductivity than either the core or the inner lining, whereby a major portion of the heat conducted through the said core is diverted through said inner lining into the interior of the utensil.

4. A utensil constituted of three layers of three different materials whose coefficient of expansion as a whole is such that no undue strain is created on any of the layers when the receptacle is subjected to changes in temperature, the center layer being composed of a strong, relatively stiff metal having high heat conductivity and the outer layers of which consist of corrosion-resisting materials having relatively low heat conductivity so that when heat is applied at any point of the utensil, it is caused to flow through said center layer, thereby distributing such heat throughout the center layer, one of said outer layers being composed of a stainless steel alloy and the other of said outer layers being constituted of an enamel capable of withstanding the effects of high heat and having a heat conductivity substantially lower than said first outer layer so that a major portion of the heat conducted through said center layer is diverted through the first outer layer.

5. A utensil constituted of three layers of different materials whose coefficient of expansion as a whole is such that no undue strain is created in any of the layers when the receptacle is subjected to changes in temperature, the center layer being composed of a strong, relatively stiff metal having high heat conductivity and a coefficient of expansion intermediate that of the two outer layers and being wholly invisible and concealed by said outer layers, said outer layers consisting of corrosion-resistant materials having low heat conductivity so that when heat is applied to any point of the utensil, it is caused to flow through said center layer, thereby distributing such heat throughout the center layer, one of said outer layers being composed of an enamel of high fusion point capable of maintaining its bond with said center layer when subjected to changes in temperature, and the other of said outer layers being composed of a stainless steel alloy and being sufficiently thinner than said center layer so as not to substantially affect the coefficient of expansion of the surface of said center layer upon which is disposed said enamel layer under changing temperature conditions, said enamel layer having a heat conductivity substantially lower than said stainless steel layer so that the major portion of the heat conducted through said center layer is diverted through said stainless steel layer.

6. A utensil or receptacle having an outer and an inner surface, one of said surfaces being constituted of chrome-nickel stainless steel, the other surface being constituted of a vitreous enamel of high fusion point having a heat conductivity substantially lower than that of the stainless steel and intermediate between the two surfaces a metallic core having a higher heat conductivity than said inner and outer surfaces and being approximately three to ten times as thick as the stainless steel layer.

7. A utensil, one surface of which is constituted of a chrome-nickel steel alloy which does not lose its corrosion-resistant properties when heated above 500° C. and then cooled, armored by a non-corrosion-resistant metal of materially less tensile strength, having a heat conductivity substantially higher than that of the steel alloy, the latter material being in turn coated with a vitreous enamel of high fusion point having a heat conductivity substantially lower than said steel alloy and said non-corrosion-resistant metal.

MARTIN H. SOMMER.